(12) United States Patent
Schumacher

(10) Patent No.: US 8,866,448 B2
(45) Date of Patent: Oct. 21, 2014

(54) CONTROL UNIT AND METHOD FOR ACTIVATING PERSONAL PROTECTION DEVICES

(75) Inventor: Hartmut Schumacher, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 12/919,880

(22) PCT Filed: Jan. 23, 2009

(86) PCT No.: PCT/EP2009/050749
§ 371 (c)(1),
(2), (4) Date: Aug. 27, 2010

(87) PCT Pub. No.: WO2009/106392
PCT Pub. Date: Sep. 3, 2009

(65) Prior Publication Data
US 2011/0012568 A1    Jan. 20, 2011

(30) Foreign Application Priority Data
Feb. 28, 2008  (DE) .......................... 10 2008 011 681

(51) Int. Cl.
| H02J 7/04 | (2006.01) |
| H02J 7/00 | (2006.01) |
| B60R 21/16 | (2006.01) |
| B60R 21/017 | (2006.01) |

(52) U.S. Cl.
CPC .................................. *B60R 21/017* (2013.01)
USPC ........................... 320/162; 320/166; 280/735

(58) Field of Classification Search
USPC .................. 320/166, 167, 128, 162; 280/735
See application file for complete search history.

(56) References Cited

U.S. PATENT DOCUMENTS 4,020,453 A * 4/1977 Spies et al. .................... 280/735
2008/0246452 A1   10/2008 Sievers et al.

FOREIGN PATENT DOCUMENTS

| DE | 19542085 | 6/2006 |
| DE | 102004057690 | 6/2006 |
| EP | 1049229 | 11/2000 |
| WO | WO 2006/058800 | 6/2006 |

OTHER PUBLICATIONS

International Search Report, PCT International Patent Application No. PCT/EP2009/050749, dated Sep. 14, 2009.

* cited by examiner

Primary Examiner — Richard V Muralidar
(74) Attorney, Agent, or Firm — Kenyon & Kenyon LLP

(57) ABSTRACT

A control unit and a method for triggering personal protection devices are proposed, which charge an energy reservoir for the control unit via a charging circuit. The charging circuit sets a charging rate for charging as a function of a signal generated outside the charging surface.

20 Claims, 4 Drawing Sheets

CONTROL UNIT AND METHOD FOR ACTIVATING PERSONAL PROTECTION DEVICES

FIELD OF THE INVENTION

The present invention relates to a control unit and a method for triggering personal protection devices.

BACKGROUND INFORMATION

German Patent Application No. DE 10 2004 057 690 A1 describes a charging circuit for a control unit for triggering personal protection devices. This charging circuit serves to charge an electrical energy storage device that is embodied as a capacitor.

SUMMARY

A control unit and method according to the present invention for triggering a personal protection device may have an advantage that the charging rate, i.e., how quickly the energy storage device with which with the energy reservoir is charged, is controlled by a signal generated outside and/or inside the charging circuit. In addition to open-loop control, closed-loop regulation is also possible. Requirements in terms of charging rate can thereby be met. It is possible in particular for smaller personal protection systems, for which only a portion of the maximum performance of the charging circuit is sufficient, also to utilize only a portion of that performance, and thereby to exhibit a lower input current to the control unit in the energy reservoir charging phase. External components having a lower load capacity can be selected as a result, contributing to a cost reduction.

A "control unit" is to be understood in the present case as an electrical unit that, as a function of sensor signals, triggers a personal protection device, such as an airbag belt tightener, but also an active personal protection device such as a brake or a vehicle dynamics control system. "Triggering" in this context is activation of those personal protection devices.

The charging circuit is preferably embodied as an integrated module that is embodied in a "communal living" situation with other functions of the control unit such as, for example, interfaces or the ignition circuit or a parallel evaluation path to a microcontroller. It is possible to embody the charging circuit discretely or from a plurality of integrated circuits.

The energy reservoir is usually one or more capacitors that are charged to a voltage between 20 and 40 V. It is alternatively possible also to embody this energy reservoir magnetically.

The signal is preferably a voltage that is generated, for example, by a resistor connected to the charging circuit. However, other arrangements can also be provided for generating this signal, for example via a software command or an output signal of another module such as, for example, a microcontroller. With the use of a signal generated outside the charging circuit it is possible to adapt this signal to different vehicles and their requirements without needing to influence the charging circuit itself. Cost advantages can thereby be achieved in terms of manufacture of the charging circuit as, for example, an integrated circuit.

The charging rate is the time required to charge the energy reservoir to a predefined voltage.

It may be advantageous if the signal is generated on the basis of a resistor connected to the charging circuit, by sending a reference current through this first resistor. The reference current is generated as a function of a second resistor connected to the charging circuit, and of a reference voltage generated in the charging circuit. This reference voltage is in turn generated, for example, as a function of the connected battery voltage, by way of a so-called bandgap circuit. This bandgap circuit then generates that reference voltage as a function of the bandgap. A reference circuit of this kind is often used in integrated circuits, utilizing the voltage difference between two diodes. By way of this voltage difference, a current is generated which brings about a voltage at a resistor. This voltage is added to one of the voltage of the diodes or of a third diode that is sometimes used. The temperature dependence can be eliminated by appropriate selection of certain parameters. The voltage that is obtained is typically between 1.2 and 1.3 V. Because this reference current that was generated on the basis of the reference voltage flows through this first connected resistor to the charging circuit, a voltage is thereby generated that determines the charging rate of the charging circuit.

Advantageously, the charging circuit generates the charging rate as a function of an n-step signal generated within the charging circuit, n steps in the charging rate then being possible. The steps can be set by way of a control circuit, preferably a processor of the control unit, via an SPI (Serial Peripheral Interface) command, or external coding resistors.

The charging circuit preferably has a precharger that charges the energy reservoir to the battery voltage. Also provided is at least one switching converter that charges the energy reservoir to an energy reservoir voltage (=VERN), this energy reservoir voltage being higher than the battery voltage. Usually, the precharger is first used as a current source in order to charge the energy reservoir, in current-limited fashion, to the battery voltage of the vehicle battery. The switching converter is usually inhibited in this phase. The switching converter is activated later in order to charge the energy reservoir, now charged to the battery voltage, to the energy reservoir voltage. In this phase the precharger is usually brought into a saturation mode (switch mode with low ON resistance) in order to reduce losses, with superimposed short-circuit protection (damage protection in the event of a fault). According to the present invention the precharger and the switching converter will respectively influence a current regulator, as a function of the signal, in order to set the respective charging current. The precharger and the switching converter form a so-called DC-DC switching converter for large energy reservoirs with connected loads. The purpose of this converter is to charge the energy reservoir. The energy reservoir can preferably also be used, after charging, to supply the components of the control unit with electrical energy. The precharger and the switching converter must then correspondingly maintain a current from the vehicle battery to the energy reservoir in order to keep the energy reservoir at its energy reservoir voltage (=VERN).

It is further advantageous that the control unit has a voltage observer that, as a function of a voltage measured at the energy reservoir, of the change over time in this voltage, or in supplementary fashion of the battery voltage (polarity-protected battery voltage=VZP), controls the precharger and the switching converter in open-loop fashion and, once the energy reservoir is charged to the rated value of the energy reservoir voltage, regulates the pulse duty factor of the switching converter in closed-loop fashion so that for a given input voltage (polarity-protected battery voltage=VZP) and a given load on the energy reservoir, the voltage is held at the rated value of the energy reservoir voltage.

When charging mode is detected (voltage of energy reservoir (VER)<battery voltage (VZP)), the switching converter is then inhibited, and the precharger charges the energy reservoir with a constant current to approximately the level of the battery voltage. When switching-converter mode is detected and if the voltage at the energy reservoir is still below the nominal value (VER>VZP and VER<VERN), the precharger is then set as a switch into the ON state (saturation mode) with short-circuit current limiting (protection) in case of fault, and the switching converter is activated with a predefined pulse duty factor within a fixed frequency. In addition, a current monitor is active in the switching converter, which monitor can prematurely terminate the ON state, deviating from the fixed pulse duty factor, if the current monitoring limit value is reached.

When switching-converter mode is detected and if the voltage at the energy reservoir is at the nominal value of the energy reservoir voltage or in the vicinity thereof (VER>VZP and VER≈VERN), the precharger is then set as a switch into the ON state (saturation mode) with short-circuit current limiting (protection) in case of fault, and the switching converter is activated with a pulse duty factor that can be unrestrictedly determined by a controller within a fixed frequency. In addition, a current monitor is active in the switching converter, which monitor can prematurely terminate the ON state, deviating from the regulated pulse duty factor, if the current monitoring limit value is reached.

This voltage observer can be part of the charging circuit, but it can also be disposed outside the charging circuit but within the control unit. The voltage observer receives the voltage value at the energy reservoir and at the battery (VZP) as a multiple of a reference voltage (bandgap), carries out a comparison and/or evaluates the change over time in the voltage at the energy reservoir. It also carries out a comparison with stored rated values of the energy reservoir voltage (VERN).

The charging circuit is preferably embodied as an integrated circuit; as indicated above, further functions can also be contained on this integrated circuit so that this integrated circuit can be provided as a system ASIC. This high level of integration allows such components to be manufactured economically.

The signal can advantageously be furnished by a control circuit located outside the charging circuit in the control unit; this control circuit can generate the signal, for example, via an analog output or as a software command.

It may be further advantageous if the control unit has a comparator that can preferably be part of the charging circuit, and that compares the voltage measured (e.g., by the voltage observer) at the energy reservoir with a reference voltage; and that an influencing circuit is provided for the signal as a function of the comparison. This influencing circuit is also preferably part of the charging circuit. This reference voltage or voltages at various points in time after charging of the energy reservoir begins is/are stored in the control unit, for example also in the integrated circuit of the charging circuit. Semiconductor memories such as a ROM, EEEPROM, or EPROM can be used for this. Other memory media are also possible for this. Multiple such voltage/time tables or voltage tables (assuming equidistance in time) can also be stored (preferably ROM), and merely selected via coding resistors at the charging circuit.

A ROM memory of the charging circuit of a control unit preferably has one or more tables of such reference voltages provided for selection, which tables can also be understood as a characteristic curve.

BRIEF DESCRIPTION OF THE DRAWINGS

Example embodiments of the present invention are depicted in the figures and are explained below.

DETAILED DESCRIPTION OF EXAMPLE EMBODIMENTS

Figure 2:
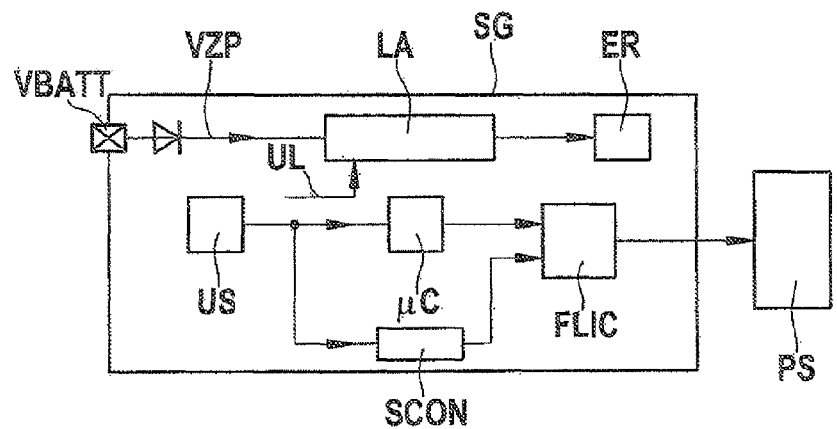
FIG. 2 shows an example control unit according to the present invention.

FIG. 2 shows an example control unit SG according to the present invention in a block diagram, only the components needed for an understanding of the present invention being depicted. Control unit SG controls personal protection devices PS, such as airbags or belt tighteners, as a function of signals of an accident sensor suite US that are evaluated by a microcontroller µC constituting an evaluation circuit; as a function of an initiation decision, microcontroller µC triggers a triggering circuit FLIC so that the personal protection devices are activated by this triggering circuit FLIC. In accordance with safety requirements for control units for triggering personal protection devices, the FLICs are authorized to activate personal protection devices PS only if a second microcontroller or a so-called safety controller (=SCON) confirms the triggering decision or arrives at the same decision. Triggering circuit FLIC uses the ignition energy for personal protection devices PS from energy reservoir ER, usually one or more capacitors, or from the battery. Energy reservoir ER is charged via a charging circuit LA to a defined value; this value is usually between 20 and 40 V. Charging circuit LA utilizes the polarity-protected battery voltage/vehicle voltage VZP (usually 6 V to 16.5 V) for charging, the charging rate at which energy reservoir ER is charged being set by the external voltage based on signal UL. This external voltage UL, constituting the signal, can be generated by a variety of possibilities. A simple possibility is generation on the basis of a resistor, through which, e.g., a reference current flows, connected to charging circuit LA. Other possibilities are generation of this voltage UL by, for example, microcontroller µC.

Figure 4:
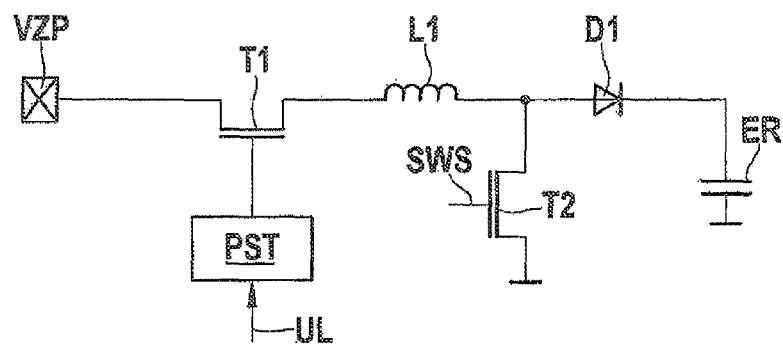
FIG. 4 shows a simplified charging circuit.

FIG. 4 is a simplified depiction of the charging circuit. The polarity-protected battery voltage/vehicle voltage VZP is used by a so-called precharger, which is made up substantially of a transistor T1 and a trigger PST, to charge energy reservoir ER to the battery voltage. In this phase of charging by the precharger, the switching converter (symbolized here by transistor T2, signal SWS, and inductance L1) is inhibited by the fact that transistor T2 allows no current to pass. The current from car battery/generator VZP can then flow through transistor T1, inductance L1, and diode D1 to energy reservoir ER in order to charge the latter. Charging is monitored by a voltage observer (not depicted) that measures the voltage at energy reservoir ER. Voltage UL does, however, as an externally generated signal, influence which charging current will flow through the precharger through transistor T1. This influence can be achieved by corresponding triggering of the gate of transistor T1, i.e., how transmissive transistor T1 is to the current from the vehicle battery/generator to energy reservoir ER.

The influence on the charging current by variable UL is normalized to a nominal value ULN. If the relationship UL>ULN is selected, the charging current through T1 rises in the ratio UL/ULN to (in this application) the default value or standard value; or, if UL<ULN is selected, the charging current through T1 decreases in the ratio UL/ULN (in this application) with respect to the default value or standard value.

When it is ascertained that energy reservoir ER is charged to the car battery voltage/vehicle voltage VZP, the precharger goes into a saturation mode (switch operation with low ON resistance); the precharger current that is then flowing is then limited, only in the event of a fault and for self-protection (short-circuit protection), to a current that is above the value required in the application for normal operation, for example two amperes.

The saturation current limit (short-circuit protection) can also be predefined, depending on the scaling requirements of the application, as a function of voltage UL in relation to a predefined voltage ULN.

In this phase, the downstream switching converter takes over control of the current flowing through the precharger on the basis of the switching converter inductance, cycle frequency, pulse duty factor, and current limiting in switching converter transistor T2.

The precharger is consequently in saturation mode, and the switching converter now transitions into charging mode; transistor T2 brings energy into inductance L1 in a predefined timed cycle as a function of signal SWS, this energy then resulting in a current flow from inductance L1 to energy reservoir ER in order ultimately to charge energy reservoir ER to the predefined value of the energy reservoir voltage.

In this charging phase, the phase that is used to charge inductance L1 can contain, for example, 90% of the timed cycle, while during 10% of the time transistor T2 is once again inhibited and thus allows current to flow out from inductance L1 to energy reservoir ER.

In addition, a current limiter is active in transistor T2; when a charging current limit is reached, this limiter can prematurely terminate the 90%/10% pulse duty factor within a fixed cycle time.

The influence on this charging current limit of transistor T2, which is switched off prematurely with respect to the standard 90%/10% time within a fixed cycle time when the limit is reached, is determined by the variable UL normalized to a nominal value ULN. If the relationship UL>ULN is selected, the charging current limit of T2 of the switching converter rises in the ratio UL/ULN to (in this application) the default value or standard value; or, if UL<ULN is selected, the charging current limit T1 decreases in the ratio UL/ULN (in this application) with respect to the default value or standard value.

If energy reservoir ER is now charged to its predetermined value VERN, the switching converter then transitions into a so-called VER regulation mode in order to hold the voltage VER. A timing function is provided in this operating mode as well: in this case the time during which transistor T2 is closed is determined as a function of a predefined time and of the ratio of battery voltage to energy reservoir voltage.

Current monitoring of the second phase in T2 is active in this third phase as well, but it normally is not applied, since the energy reservoir is charged and only the current of the loads now needs to be furnished to the energy reservoir voltage.

In the present case, the control unit with all its components is powered from the energy of energy reservoir ER, so it keeps this energy reservoir constantly charged in order to have at hand, in case of initiation, sufficient energy to trigger the personal protection devices.

Figure 3:
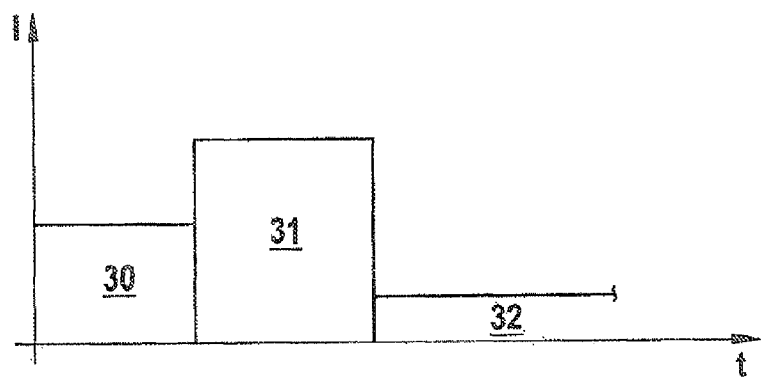
FIG. 3 is a current/time diagram.

FIG. 3 shows the three charging phases for energy reservoir ER. In a first phase 30, the precharger handles the charging of the energy reservoir to battery voltage. In the subsequent phase 31, charging is accomplished by the switching converter, to energy reservoir voltage. In phase 32, the energy reservoir is regulated to the energy reservoir voltage, only the loss in terms of the energy required for powering control unit SG now being compensated for.

Figure 1:
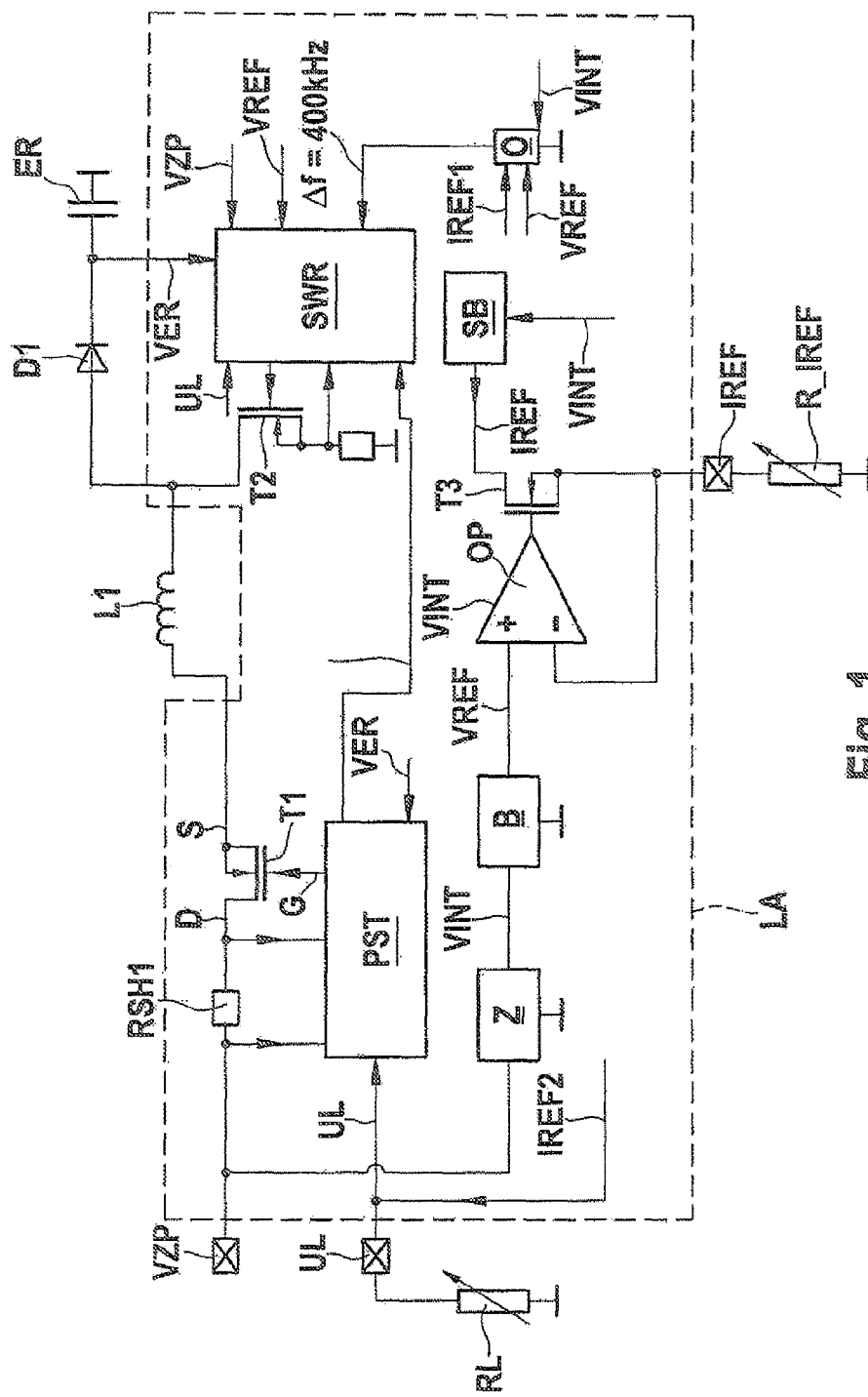
FIG. 1 shows an example embodiment of the charging circuit according to the present invention with connected components.

FIG. 1 shows an example embodiment of the charging circuit according to the present invention with the connected components. The polarity-protected battery voltage/vehicle voltage VZP is sent into a prestabilizer Z, for example a Zener diode circuit of the charging circuit; this Zener diode then outputs the voltage VINT that is used in circuit B to create reference voltage VREF on the basis of a bandgap circuit. This bandgap voltage goes into operational amplifier OP that is connected at its output to a transistor T3, which in turn is fed back via its source to the negative input of operational amplifier OP. This circuit generates reference current IREF, specifically by way of the external resistor R_IREF connected to ground. This current IREF, which ultimately flows through the drain-source portion of transistor T3 and to resistor R_IREF, goes into a current bank SB from which, by way of current mirrors, multiples of this reference current can be generated for further purposes. The current bank is fed from VINT.

This reference current is used in particular to flow through resistor RL; in the present case a multiple of this reference current, specifically a multiple of 1.33, is used. This multiple is selected so that for RLN=R_REF, the default value of voltage UL=ULN lies at the center of the analog voltage supply, for example 3.3 V÷2=1.65 V. The reference current causes, in external resistor RL, the reference voltage UL at charging circuit LA. This voltage UL is then present at open-/closed-loop controller PST for the precharger. As a function of this voltage UL, the actual precharger current IT1 sensed via shunt RSH1 is compared with a target value IT1linear_N*UL/ULN, and the gate of transistor T1 is triggered so that the target and actual values agree. The current that flows from the vehicle battery/generator (VZP) through resistor RSH1, the drain-source portion of transistor T1, inductance L1, and diode D1 to energy reservoir ER as a charging current is thereby defined a priori by voltage UL. Voltage UL thus defines this current that is used to charge energy reservoir ER in phase 1 to the battery voltage level or vehicle voltage level; the charging rate for a given energy reservoir capacity is also thereby determined, since charging by the precharger ends when the battery voltage/vehicle voltage (VZP) is reached at energy reservoir ER. At the same time, transistor T2 of the switching converter is inhibited, so that the switching converter contributes nothing to battery voltage during this charging phase. If, however, voltage VER is equal to voltage VZP or is in a so-called capture region, open-/closed-loop controller PST then shifts the precharger into a saturation mode, i.e., the current regulation target value is set to IT1shortcircuit_N*UL/ULN. This value is selected to be sufficiently high that it cannot be reached in a normal application instance, and the transistor therefore transitions into the almost lossless "On" state, Rdson=0 to 2 ohm. This target value for IT1 in charging phase 2 also scales with voltage UL. At the beginning of phase 2, open-/closed-loop controller PST also forwards an enable signal for transistor T2 to the open-/closed-loop controller of switching converter SWR.

In the switching-converter mode of charging phase 2, the maximum permissible current through T2 (and thus also through L1 and T1) is influenced in a timed phase as a function of voltage UL, and the charging rate of the energy reservoir, in this phase to the point where VER=VERN is reached, is thus influenced. The triggering system for switching converter SWR measures voltage VER In order to detect when charging is finished. When VER has reached the target value VERN, or a so-called capture region of the target value, charging phase 3 is switched on. Timing is achieved by way of an internal oscillator O that achieves oscillation as a function of voltage VINT, VREF, and IREF1. The frequency can be, for example, 400 kHz.

As indicated above, switching converter SWR carries out timing in order, in a first phase of the timing cycle, to charge inductance L1 and, in a second phase of the timing cycle, to enable inductance L1 to discharge to energy reservoir ER. In the present case, 90% of the available cycle time is provided a priori for charging, and 10% for discharge.

The actual charging is additionally determined by sensing the current IT2. If current IT2 reaches the limit value IT2sw_N*UL/ULN during a charging phase (0-90%) of the available cycle time (T=2.5 μs), the charging phase is then terminated even before the 90% a priori condition is reached. Voltage UL therefore influences the charging rate of the energy reservoir in charging phase 2.

When charging phase 3 is reached, i.e., VER in the capture region of VERN, open-/closed-loop controller SWR then cancels the a priori definition (constrained timing) of the switching converter using the 90%/10% values, and leaves setting of the charging and inhibition phases of the converter to a pulse width modulation (PWM) control system that, as a function of the current load on VER and the magnitude of the input voltage, defines a new suitable charging phase and inhibition phase within each fixed cycle time. Current monitoring by way of shunt RSH2 continues to be maintained, but is no longer utilized in a normal application instance, since when the energy reservoir is charged, the current for the loads present at VER is much lower. It serves only for short-circuit protection at VER.

FIG. 1 showed the predefined adaptation of the charging rate to a predefined application. A high voltage UL meant a high charging rate; a low voltage UL meant a low charging rate. The actual charging rate still varied considerably (+/−50%), since the capacitance tolerances are high (+/−35%) and the economically achievable current regulation accuracies are moderate (+/−15%).

Figure 5:
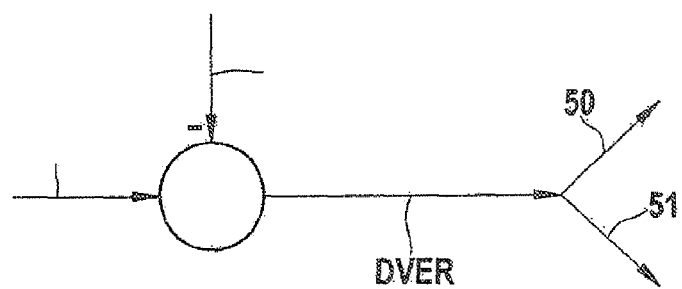
FIG. 5 shows a signal association.

FIG. 5 therefore shows a refinement of an example embodiment of the present invention. FIG. 5 depicts the fact that the voltage VER_Ist(tn) measured by the voltage observer at various times to during charging phases 1 and 2 is subtracted from the reference voltage VER_Soll(tn). The different DVER(tn) is used to modify voltage UL for precharger 50 and for switching converter 51 at the various times so that charging can thereby be better adjusted to the desired value. This results in an improved charging rate tolerance, and thereby increases overall accuracy.

Figure 6:
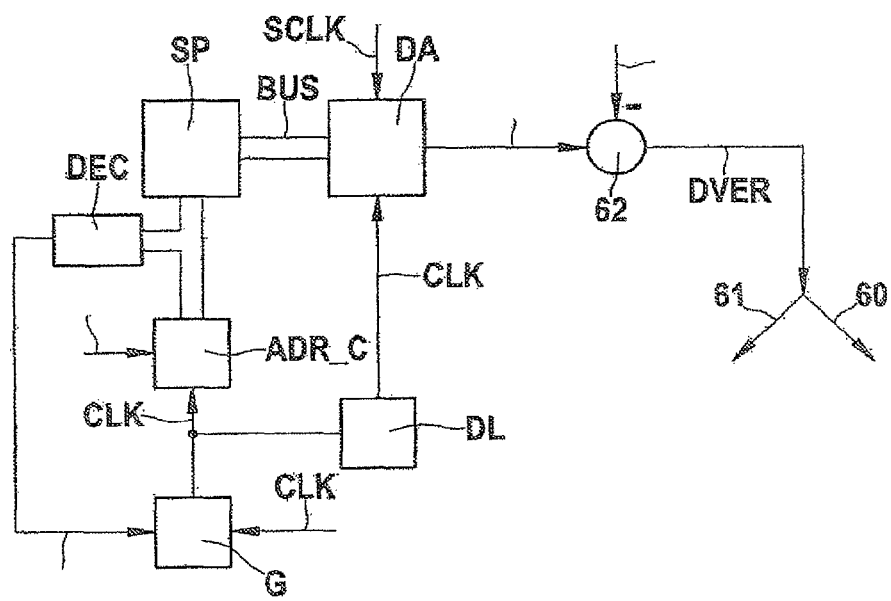
FIG. 6 is a block diagram.

FIG. 6 shows this in detail. It once again depicts subtracter 62, in which a subtraction of reference voltage VER_Soll(tn) and actual voltage VER_Ist(tn) is carried out in order to use the difference voltage DVER(tn), which is used to influence precharger 60 and/or switching converter 61 so as to influence voltage UL correspondingly. The respective reference voltage is loaded from a memory SP that can be disposed, for example, in the charging circuit or at another location in control unit SG. These reference values are directed via a BUS to a DA converter that converts the digital voltage into an analog value that can be compared with the measured value. Entirely digital evaluation is of course also possible.

The values are read out in timed fashion in the present case, for example at a cycle time of 100 ms. For this, an address counter ADR_C is initialized at startup of the control unit, and causes the reference values to be read out from memory SP at a cycle time of, for example, 100 ms with signal CLK; simultaneously connected to the address bus is a decoder DEC that, at the stop address, causes a gate G to be closed when that start address is reached. The final value should then normally be reached. Gate G allows the timing cycle to pass to address counter ADR_C, and also to a delay element DL that forwards the timing cycle to the digital-analog converter.

In charging phases 1 and 2, gate G allows the timing cycle to pass to address counter ADR_C, and also to a delay element DL that forwards the timing cycle in delayed fashion to the digital-analog converter.

By stipulating a new address, a new data value VER_soll (tn)_digital is introduced onto the BUS to the DA converter and, if the latter is stable, is converted in delayed fashion by the DA converter into an analog value VER_soll(tn). Conversion in the DA converter occurs with a fast system clock (cycle time).

Figure 7:
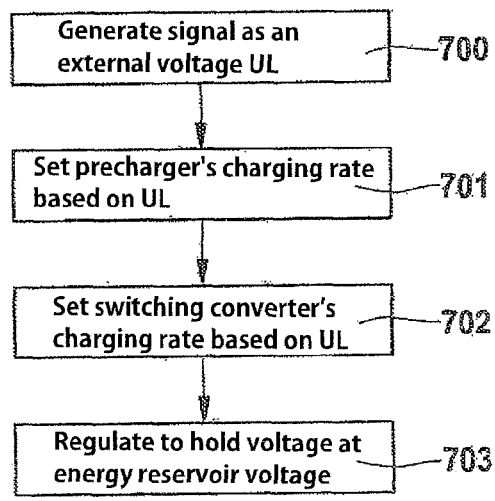
FIG. 7 is a flow chart.

FIG. 7 is a flow chart of an example method according to the present invention. In method step 700, the signal is generated as external voltage UL, for example (as set forth above) by way of external resistor RL that is connected to the charging circuit and can be variable. In method step 701, the precharger is influenced in terms of its charging rate by this voltage UL. Once the energy reservoir is charged to the battery voltage, in method step 702 the switching converter is also influenced in terms of charging rate, in the manner described above, as a function of voltage UL. Once the energy reservoir has reached its energy reservoir voltage, i.e. the final voltage, regulation to that voltage occurs in method step 703.

What is claimed is:

1. A control unit for triggering a personal protection device, comprising:
   a charging circuit to charge an energy reservoir for the control unit of the personal protection device; wherein:
   the charging circuit is adapted to regulate a charging current of the energy reservoir to achieve a target charging rate;
   the target charging rate is determined by the charging circuit as a function of a first signal generated from at least one of outside and inside the charging circuit; and
   the first signal is derived from a fixed reference voltage generated by a bandgap circuit.

2. The control unit as recited in claim 1, further comprising:
   a first resistor connected to the charging circuit and a second resistor connected to the charging circuit, wherein the first signal is generated by passing a reference current through the first resistor, the reference current being generated as a function of the second resistor and of the reference voltage.

3. The control unit as recited in claim 1, wherein:
   the charging circuit includes a precharger adapted to charge the energy reservoir to a battery voltage, and a switching converter adapted to charge the energy reservoir to an energy reservoir voltage, the energy reservoir voltage being higher than the battery voltage; and
   the precharger and the switching converter both receive the first signal as an input, and each respectively includes a current regulator which regulates a respective charging current as a function of the respectively received first signal.

4. The control unit as recited in claim 3, wherein:
   the precharger and the switching converter are controlled in an open-loop fashion; and
   once the energy reservoir is charged to the energy reservoir voltage, the switching converter is regulated in a closed-loop fashion to hold the energy reservoir at the energy reservoir voltage.

5. The control unit as recited in claim 4, wherein the switching converter is regulated in the closed-loop fashion by regulating a pulse duty factor of the switching converter.

6. The control unit as recited in claim 1, wherein the control unit includes a voltage observer, as a function of a voltage measured at the energy reservoir, adapted to switch the precharger into a current-controlled or limited charging mode and inhibit the switching converter, or switch the precharger into a saturation mode with low continuity resistance, and switch the switching converter respectively into a charging mode or a saturation mode by current regulation or by limitation to a value that lies above the current limitation of the switching converter.

7. The control unit as recited in claim 1, wherein the charging circuit is embodied as at least one integrated circuit.

8. The control unit as recited in claim 1, wherein the first signal is furnished by a control circuit located outside the charging circuit in the control unit.

9. The control unit as recited in claim 1, wherein the control unit includes a comparator adapted to compare a voltage measured at the energy reservoir with a reference voltage of the energy reservoir, and includes a circuit to influence the first signal as a function of the comparison.

10. The control unit as recited in claim 9, further comprising:
a memory that has a table of reference voltages for use as the reference voltage of the energy reservoir.

11. The control unit as recited in claim 10, wherein values for the reference voltages of the energy reservoir that are provided in the memory are processed in a previously defined time sequence, the first signal being influenced in the time sequence.

12. The control unit as recited in claim 1, wherein the charging circuit is adapted to determine the target charging rate as a function of a ratio between a value of the first signal and a value of an n-step signal generated within the charging circuit.

13. A control unit for triggering a personal protection device, comprising:
a charging circuit to charge an energy reservoir for the control unit;
wherein:
the charging circuit is adapted to regulate a charging current of the energy reservoir to achieve a target charging rate;
the target charging rate is determined by the charging circuit as a function of a first signal generated from at least one of outside and inside the charging circuit; and
the charging circuit is adapted to determine the target charging rate as a function of a ratio between a value of the first signal and a value of an n-step signal generated within the charging circuit.

14. The control unit as recited in claim 13, further comprising:
a control circuit adapted to set the steps via at least one Serial Peripheral Interface (SPI) command or via at least one external coding resistor.

15. A method for triggering a personal protection device, comprising:
charging with a charging circuit an energy reservoir for a control unit of the personal protection device;
regulating, by the charging circuit, a charging current of the energy reservoir to achieve a target charging rate, wherein the target charging rate is determined by the charging circuit as a function of a first signal generated at least one of outside and inside the charging circuit; and
deriving the first signal from a fixed reference voltage generated by a bandgap circuit.

16. The method as recited in claim 15, further comprising:
comparing a voltage measured at the energy reservoir with a reference voltage of the energy reservoir; and
influencing the first signal as a function of the comparison.

17. The method as recited in claim 15, further comprising:
applying the first signal as an input to a precharger in the charging circuit, wherein the precharger is adapted to charge the energy reservoir to a battery voltage, and the precharger includes a first current regulator that regulates a charging current of the precharger as a function of the first signal; and
applying the first signal as an input to a switching converter adapted to charge the energy reservoir to an energy reservoir voltage, the energy reservoir voltage being higher than the battery voltage, wherein the switching converter includes a second current regulator which regulates a charging current of the switching convertor as function of the first signal.

18. The method as recited in claim 17, further comprising:
controlling the precharger and the switching converter in an open-loop fashion; and
once the energy reservoir is charged to the energy reservoir voltage, regulating the switching converter in a closed-loop fashion to hold the energy reservoir at the energy reservoir voltage.

19. The method as recited in claim 18, wherein the regulating of the switching converter in the closed-loop fashion is performed by regulating a pulse duty factor of the switching converter.

20. The method as recited in claim 15, further comprising:
determining the target charging rate as a function of a ratio between a value of the first signal and a value of an n-step signal generated within the charging circuit.

* * * * *